United States Patent Office 3,384,681
Patented May 21, 1968

3,384,681
BLOCK COPOLYMER PREPARED FROM AMINE TERMINATED POLYALKYLENE GLYCOLS AND POLYAMIDES OR POLYUREAS
Hidehiko Kobayashi and Kiichiro Sasaguri, Tokyo, and Yoshihisa Fujimoto, Saitama-ken, Japan, assignors to Asahi Kasei Kogyo Kabushiki Kaisha, Osaka, Japan, a corporation of Japan
No Drawing. Filed Nov. 30, 1965, Ser. No. 510,701
Claims priority, application Japan, Dec. 2, 1964, 39/67,611; June 18, 1965, 40/36,012
12 Claims. (Cl. 260—857)

ABSTRACT OF THE DISCLOSURE

A method for the synthesis of a block copolymer, in which two essentially different kinds of molecular chains A and B are combined, the molecular chain A being a polymer residual radical of a polyoxyalkylene polyoxymethylene glycol or copolymer thereof, removed of terminal amino groups from bifunctional polymer which is selected from the group having primary amines at both terminals and containing secondary amine in an amount of 3 to 15 equivalent percent of the total amine and has a secondary transition point below −30° C. and a molecular weight of 500 to 6,000. The molecular chain A constitutes 50 to 96% weight of the block copolymer. The molecular chain B is a polyamide or polyurea and it contains at least one repeating unit of a polymer having a melting point above 230° C. in a fiber-forming molecular weight range, the repeating unit being

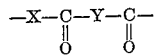

or

where —X— and —Y— are bifunctional organic radicals, the radical —X— containing the terminal nitrogen atom to each of which is attached one of the indicated free valences of the said radical —X—. At least some of the molecular chain B is connected to a terminal carbon atom of the segments of the molecular chain A by a linkage selected from the group consisting of

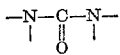

and

through an

of said linkage.

This invention relates to a method for preparing linear block copolymers having a novel composition containing nitrogen. More particularly the invention pertains to a process for preparing novel polymers to be used for the production of shaped articles of polymers such as, for example, films, continuous filament and staple fibers or processed woven or non-woven cloth, felt and paper-like substances, in order to impart compounded properties thereto.

Limitless improvements in physical properties of shaped articles of polymers are desired in order to satisfy endless requirements of consumers, such as, for example, in the case of resins, improvements in thermal resistance, impact resistance, etc., and in the case of fibers, impartment of moisture absorptivity, control in elasticity, removal of brittleness or, in specific cases, addition of brittleness, and improvements in tenacity and hand, which are expressed markedly abstract wordings. However, it is not too much to say that in order to sufficiently satisfy said requirements, there is seen a limit so far as simple polymers which have heretofore been used are employed as starting materials. The present invention is different from usual practices of conventional polymer production processes to provide novel polymers as well as to provide a method which induces rapid development of materials for shaped articles of polymers.

The gist of the present invention resides in a method for preparing block copolymers having a novel substantially linear structure. Substantial advantage attained by practicing the method of the present invention are the impartment of physical properties which have never been seen in conventional synthetic fibers by improving the synthetic fibers in quality, and the development of a wide marketability and useful values derived therefrom.

The fundamental question connected with the method of the present invention is to regulate the content of a soft molecular chain selected in blockwise copolymerizing two different molecular chains, as well as to designate the nature of a rigid molecular chain to be linked therewith. In other words, the block copolymer having a substantially linear structure which is prepared in accordance with the method of the present invention is composed of two molecular chains: a soft molecular chain and a rigid molecular chain. For convenience, the former will be referred to as the first chain and the latter as the second chain. One of the important elements constituting the present invention relates to the content of suggesting the selection of the first chain, more particularly, to a means for using as the first chain of block copolymer a polyether in which a suitable amount of a secondary amine is included in the molecular chain and both terminals of the molecular chain are amino groups. The object of the present invention can be achieved by adoption of smooth polymerization techniques with high reaction rate in order to produce substantially linear block copolymers having desirable chemical compositions and physical characteristics. In the blockwise linked substantially linear polymers, the first and the second chains are alternately linked, more particularly, the two chains are bonded through amide or urea linkages. The first chain has a low second transition point and is relatively long in molecular chain as compared with the second chain. The second chain is composed of one or more repeating unit of a polymer having nitrogen in the polymer chain but adjacent nitrogens and having a melting point above about 230° C. in its fiber forming molecular weight range. In case a chain less in repetition number of unit structures is used in practicing the method of the present invention, it might be proper to use the expression "second segment (or segments)" rather than the expression, "second chain." For convenience, however, the expression "second chain" is adopted.

The block copolymer is a polymer which contains nitrogen atoms in the form of amide or urea groups and in which the second chain having a non-bisurylene high melting, or rigid molecular chain structure is chemically bonded by amide or urea linkage with the first chain having a low transition point. Generally, the polymer may be represented by the formula

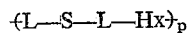

wherein S means the first chain, being the residue on removal of the functional groups of a bifunctional polymer, i.e., a polymer molecular chain represented by $H_2N-S-NH_2$, which has a molecular weight of from 500 to 6,000 and a second transition point of below −30° C.; L is an amide-linked group —NH—CO— or urea-linked group —NHCONH—; H represents the unit structure of a polyamide having a structure repeated by —CONH— linkages or the unit structure of polyurea having a repetition structure through —NH—CO—NH— linkages and in each case the recurring units are connected to the carbon atoms of the polymer chain; $x$ is a number not smaller than 1; and $p$ gives such a numerical value that the average molecular weight of the block copolymer becomes more than 30,000. In other words, the block copolymer having a substantially linear structure which is represented by the aforesaid general formula is defined as the repetition of two kinds of chains substantially connected through chemical linkages, but it is not objectionable that the block copolymer, its constituent hard molecular chains or soft molecular chains may have some molecular weight distribution. However, the molecular weight distribution of the first chain shows the most marked effect on the physical properties of fibers produced by using said copolymers as starting materials and hence is desired to be as uniform as possible. In the polymerization of cyclic esters, a continuous polymerization process is preferentially employed. As the continuous polymerization process, one or multi vessel-continuous polymerization process is ordinarily adopted according to the known art.

The first chain, which has specific second transition point and molecular weight as stated before, is required to occupy at least 50% by weight of the total block copolymer. The content varies to a considerable extent depending on the kind of shaped articles to be made from the polymer and on the physical properties required for the polymer. However, block copolymers containing more than 96% of the first chain cannot be the objective of the present invention. The second chain is having a melting point above 230° C. in its fiber forming molecular weight range. Generally, the second chain has the structure

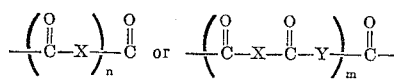

wherein $n \geq 1$, $m \geq 1$, and $n$ is an integer with respect to individual constituent chains but $m$ is not always an integer since the structure can take the form of

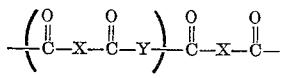

($y$ is an integer $\geq 1$); X and Y are bifunctional organic radicals and at least X contains terminal nitrogen atoms, to each of which is connected to one of the indicated free valences of the said radical —X—; and at least some of the second chains connected by chemical linkage selected from the group consisting of

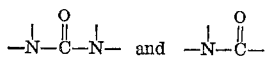

through said

to the terminal carbon atom of the first chain (the aforesaid S).

The polymer is prepared according to any of melt solution and interfacial polymerization processes. The physical characteristics of the block copolymer resides in its high melting point and low second transition point. The second chain forming the copolymer can be easily selected from the list of a series of known polymers by considering melting point, crystallinity and the like. For example, "Collection of Data of High Molecular Weight Substances" (1962), published by Kobunshi Gakkai is a recommendable material therefor. Further, a list preferred when a polyamide polymer is considered to be used as said molecular chain is set out in B. B. Karschak et al.: "Synthetic Heterochain Polyamide," pages 24–77. However, in case a very short chain is used as the second chain constituting the block copolymer, it is to be noted that the melting point becomes lower than in the case of the second chain polymer having a molecular weight within the fiber-forming range. This is clear when, in extreme cases, the melting point of monomer is compared with that of polymer. It is also necessary to take always into consideration that a lowering in melting point is seen due to the solvent effect at elevated temperatures of the first chain on the second chain, though there are some differences in such solvent effects depending on chain characteristics. Therefore, the high melting segment is required to have a melting point of at least 230° C. in the fiber forming molecular weight range, as mentioned before, but the use of a constituent block chain which comes to have a melting point of 160° C. in the resulting block copolymer is not desirable.

One of the characteristics of the method of the present invention is to use as the low transition point molecular chain a polyether containing a secondary amine in the molecular chain and having primary amino groups on both terminals. However, polyethers usable for the purpose of the present invention cannot be prepared according to the conventional processes. It is known that a polyether having diamines on both ends can be produced, in general, according to a process carried out by cyanoethylating poly(alkyleneoxide)glycol, followed by reduction. In this process, however, the cyanoethylation reaction is reversible, and other groups such as hydroxyl groups or hydrocarbon groups are readily formed as the terminals groups due to the imperfectness of the cyanoethylation reaction and to the easiness in hydrogenation decomposition of terminal ethers. Therefore, the polyether obtained according to the above process is not sufficient to be used as a starting material for the block copolymer. A process for preparing the industrially useful, inexpensive and high purity polyether diamine to be used in the method of the present invention (the polyether diamine means $\alpha,\omega$-diaminopolyalkylene oxide and, for simplicity, is referred to as the polyether diamine hereinafter), is achieved only in combination with a process for producing a high purity polyether having halogen atoms directly bonded to both ends, such as $\alpha,\omega$-dichloropolyalkylene oxide, which can effect terminal amination easily and reasonably. Regarding the polymerization of cyclic ethers, many catalyst systems have conventionally been known. However, there are not many catalyst systems capable of giving high molecular weight polyethers in an easily controllable state. Moreover, a process for the direct production of polyethers having functional groups capable of easily effecting the terminal amination has not been known. For example, among the catalyst systems employed in the conventional processes relating to the polymerization of tetrahydrofuran, a catalyst system giving a relatively high molecular weight is phosphorus pentafluoride-tetrahydrofuran. This system, however, cannot give a material suitable for achieving the object of the present invention. Further, a polymerization process using antimony pentachloride has been known. According to this process, however, the molecular weight control of the resulting polymer is difficult and further a polyether having halogen atoms regularly bonded to both ends cannot be obtained at a high purity. Thus, the above process neither provides a material suitable for the object of the present invention. As a result of various studies on polymerization catalysts for a wide scope of cyclic ethers including epoxy compounds, the present inventors have found that a binary catalyst comprising antimony pentachloride and thionyl chloride or antimony pentachloride and phosgene can give high molecular weight polyethers in higher yields and more easily than in the cases where said or other known catalyst systems are used. According to said binary catalysts, the molecular weight of the resulting polymers can be controlled with marked ease by regulating the polymerization conditions. Further characteristics of the above catalyst systems are as follows: They make it possible to effect the synthesis of a high purity polyether having halogen atoms directly linked to both terminals of the molecular chain. The use of said catalyst systems results in that, in conducting terminal amination, there is accompanied no such coloration reaction as frequently seen in the case where the starting material employed is an α,ω-dihalogenopolyalkylene oxide synthesized according to conventional process. Further, the above catalyst systems can easily provide a high molecular weight copolymer which is greatly excellent in condensation copolymerization property with a high melting molecular chain (the second chain) as compared with an α,ω-diaminopolyalkylene oxide obtained by using as a starting material an α,ω-dihalogenopolyalkylene oxide synthesized according to conventional process.

The polymerization mechanism according to said binary catalysts comprising antimony pentachloride and thionyl chloride or antimony pentachloride and phosgene is not completely clear. However, when these catalyst systems are used to polymerize a five-membered cyclic ether or a mixed system of five-membered and four-membered cyclic ethers, the polymerization reaction proceeds colorless to give at a high yield a polymer having a desired molecular weight. This fact indicates that the polymerization according to the above catalyst systems is substantially different in mechanism as well as in effect from polymerization by use of a single antimony pentachloride catalyst in which the polymerization reaction progresses in a purple black colored state, or from polymerization reaction in which a binary catalyst comprising ferric chloride, aluminum chloride or stannic chloride and thionyl chloride is used. Thus, the binary catalysts of the present invention make it possible to obtain a polyether having a desired molecular weight in such a state where undesirable side reactions have completely been inhibited.

In order to obtain at a high yield a polyether having a desired molecular weight, it is necessary to select conditions suitable for the production thereof. For example, for the purpose of preparing a polymer having a relatively high molecular weight, it is proper to use, per 100 parts by weight of cyclic ether, 0.01–1.0 part by weight of antimony pentachloride and 0.1–10 parts by weight of thionyl chloride. However, in case a polyether having an optional molecular weight which is not required to be particularly high in molecular weight is desired to be obtained, the amount of catalyst and the polymerization temperature are greatly variable depending on the desired molecular weight. For example, the amount of thionyl chloride can be increased to 100 parts by weight per 100 parts by weight of cyclic ether. The polymerization temperature to be adopted is from −10° C. to 30° C., preferably from −5° C. to 27° C., and the polymerization time is dominated by the amount of catalyst employed and the polymerization temperature. Ordinarily, the polymerization time may be about 2–30 hours and should be suitably decided according to the desired molecular weight. Even in the case where a three-membered cyclic ether such as ethylene oxide is contained in the cyclic ether to be polymerized, the binary catalyst of antimony pentachloride and thionyl chloride and the binary catalyst of antimony pentachloride and phosgene are excellent catalysts like in the above case. In the case of a system containing a three-membered cyclic ether, a binary catalyst of stannic chloride and thionyl chloride, a binary catalyst of boron trifluoride or its complex compounds and thionyl chloride, and a binary catalyst of stannic chloride and phosgene can also be used as good polymerization catalysts. In addition thereto, there are binary catalysts comprising metal chlorides or the like and thionyl chloride or phosgene, but these catalyst systems are undesirable since they are low in polymerizability and tend to bring about coloration.

The case, where a mixed cyclic ether liquid containing a three-membered cyclic ether is polymerized with the aforesaid catalyst systems, is characterized in that the molecular weight control of the resulting polymer can be easily effected by varying the amount of thionyl chloride or phosgene. The amount of catalyst, polymerization temperature and polymerization time can be selected according to the desired object, like in the case as stated before. In practicing polymerization reactions using said polymerization catalyst, a solvent may be used but it is required to be a substance inert to Friedel-Crafts catalyst, in general. From the industrial economy, therefore, it is desirable to adopt a process according to bulk continuous polymerization, in general. The polyester prepared according to the above process is treated with a base such as pyridine to inactivate the residual catalyst and is further subjected to heat treatment, whereby a polyether having halogen atoms on both ends can be obtained.

As the cyclic ether employed as a starting material for said polyether, tetrahydrofuran is frequently used, but a copolymer of tetrahydrofuran with at least one compound represented by the general formula

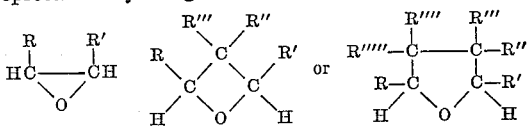

i.e., an epoxy compound, oxacyclobutane compound or oxacyclopentane compound is also preferred. Ordinarily, a polyether having a molecular weight of from 500 to 6,000 is used in practicing the method of the present invention. In the above formulas, R, R', R'', R''', R'''' and R''''' are required to be groups inert to the catalyst, such as hydrocarbon, halogen and halogenated hydrocarbon groups, groups containing ether-state oxygen in said groups, and hydrogen atoms. More particularly, these groups are those containing aliphatic, alicyclic, aromatic or both aliphatic and aromatic, and some groups contain in addition to carbon and hydrogen atoms, halogen, preferably chlorine atoms, or alkoxy or aryloxy groups. Some of these groups contain a carbon-carbon unsaturation linkage in the aliphatic portion, and there are some groups in which the R group links to another group to form a cyclic structure. The expression "inert to the catalyst" referred to in the above signifies that the chemical groups thereof do not react with the catalyst, or even when they have reacted therewith, the reaction rate is very low as compared with that of the catalyst and cyclic ether and the polymerization reaction is not inhibited. Groups active to the catalyst are those containing functional groups having active hydrogen, such as amino, hydroxyl and carboxyl groups. Further, groups containing oxygen or halogen atoms are also active to the catalyst unless said atoms are separated from other oxygen atoms by means of at least 2 carbon atoms.

Embodied examples of those employed in practicing the method of the present invention are ethylene oxide, 1,2-propylene oxide, 1,2-butylene oxide, 1,3-butylene oxide, 2,3-butylene oxide, 2-methyl-1,3-propylene oxide, 1,2-octylene oxide, 1,2-cyclohexylene oxide, 3-chloro-1,2-propylene oxide, 2-phenyl-1,2-ethylene oxide, 3-(o-chlorophenyl)-1,2-propylene oxide, 2,2-bis-chloromethyl-1,3-propylene oxide, 2-(p-tolyl)-1,3-propylene oxide, 1,4-epoxy-cyclohexane, 3-methoxy-1,2-propylene oxide, 4-(3-methoxyphenyl)-1, 2-butylene oxide, 3-phenoxy-1,2-propylene oxide, 2-methyl-2-methoxymethyl-1,3-propylene oxide, 2-vinyl-1,2-ethylene oxide, 1-aryl-1,2-ethylene oxide, 1-aryl-1,2-propylene oxide, 2-ethyl-2-aryl-1,3-propylene oxide, 1-aryloxymethyl-1,2-ethylene oxide, 2-(4-arylphenyl)-1,2-ethylene oxide, etc. Further, cyclic ether compounds having polymerizability in the aforesaid catalyst systems (for example those selected from the series of the above compounds) are frequently polymerized to a homopolymer or a copolymer. In addition, cyclic ether compounds preferably employed in practicing the method of the present invention are compounds which, in the formation of polymers, are markedly less in probability of containing other groups or atoms than desired functional groups and hydrogen atoms in the terminal carbons, more particularly a series of compounds of the aforesaid formulas in which R and R' are H.

The polyether having halogen atoms on both ends of the molecular chain which has been prepared according to the above process is reacted with ammonia, if necessary while heating or under pressure, whereby it can be converted at high yield and purity into a polyether having amino groups on both ends. A great characteristic to be further added with respect to the preparation of the polyether having terminal amino groups according to the above process which is to be used in the method of the present invention is the fact that secondary amine is contained in a markedly reasonable state in the molecular chain and that the content thereof can be optionally controlled.

Among the substantially linear block copolymers in accordance with the method of the present invention, those containing a relatively large amount of the "the first chain," i.e., the secondary amine-containing polymer, in the block copolymer components, are suitable as materials for use in the production of elastomeric shaped articles. It is a well known fact that, in the field of fibers and substances related thereto, the advent of synthetic substances (particularly fibers) substitutable for rubber has been required. The requirement is such that the synthetic substances be excellent in elasticity, Young's modulus and resistance to friction and be rendered with high resistance to chemicals, heat and light. The fact that synthetic substances made by the blockwise linkage of a low transition point molecular chain and a high melting point molecular chain give rubber elasticity has been substantiated by the synthesis of polyurethane. However, Spandex fibers prepared from said polymers greatly suffer from drawbacks derived from lack of resistance to light, chemicals and heat and have no physical properties sufficiently viewed from the concept of conventional synthetic fibers. In other words, an extraordinary attention is concentrated to the function rubber elasticity, the above drawbacks are not so argued at present, but said fibers are merely superior to the so-called natural rubber fibers. Thus, the practice of the method of the present invention is of great importance in such a sense that it has been successful in forwarding elastic fibers several steps as synthetic fibers.

The above-mentioned block copolymers employed for the purpose of elastomers contains in the total block copolymer 50 to 96% by weight of "the first chain." In other words, the method of the present invention is of course applicable to block copolymers having other composition than the above, but these copolymers are not desirable as starting materials for elastomers though they provide excellent polymers for other applications. The elastomer in accordance with the method of the present invention is actually non-crystalline wider X-ray pattern at room temperature and obtained by producing a bifunctional low transition point prepolymer and by the linkage of, for example, said secondary amine containing $\alpha,\omega$-diamino(polyalkylene oxide) and other high melting point molecular chains (segments). As a fiber-forming block copolymer, the elastomer desirably has a sticking temperature of above 140° C. The above-mentioned elastomeric polymer composition prepared by the method of the present invention has a high elastic recovery (more than) 90%, a low stress relaxation (less than 20%) and a higher elastic modulus than conventional rubbers. Elastic recovery or tensile recovery is percentage return to original length within one minute after the tension has been released from a sample which has been elongated 50% at the rate of 100% per minute and held at 50% for one minute. The stress relaxation is the percent loss in stress in a yarn one minute after it has been stretched to 50% at the rate of 100% per minute.

The second chain constituting the block copolymer, in other words the rigid segment or high melting point molecular chain is composed of at least one unit of a polymer, which is not necessarily a homopolymer. That is, there are such cases where the high melting point component is composed of one unit or several units of a homopolymer, or is composed of some sort of a copolymer. Essentially, it is desirable to adopt units of a polymer having a melting point of at least 230° C. in the fiber forming molecular weight range so that the resulting block copolymer has a melting point of at least 160° C. Ordinarily, the high melting point molecular chain can be most easily formed in the case of a homogeneous polymer (composed of a repetition of a single structure). The length of a desirable rigid molecular chain (or segment) varies depending not only on the structure thereof but, to a certain extent, on the molecular weight of the low transition point first chain. In order to obtain an elastic block copolymer having desirable physical properties in accordance with the method of the present invention, it is desirable that the length of rigid segment is dependent upon the structure of high melting point molecular chain, that is, the segment has one or more units of a polymer which should be chosen to have a higher melting point as the length of segment becomes shorter. The low transition point molecular chain constituting the block copolymer may either be a homopolymer or a copolymer. The most essential characteristic is that said chain is bifunctional and has a second transition point of below −30° C. These high molecular chains are the above detailed polymers expressed as polyalkylene oxides containing secondary amines in the chains and have amino groups as terminal functional groups. The low transition point molecular chain reacts with the high melting point segment to form amino or urea linkages. One of the characteistics of the present invention is that the block copolymer is assembled by means of amide or urea linkages which are more stable than urethane groups. This fact produces such a markedly great characteristic that the elastic polymers in accordance with the method of the present invention are melt-spinnable.

In the rigid segment of the block copolymer, a diamine is frequently used as one constituent. This damine may be any of of primary or secondary aliphatic, alicyclic, heterocyclic or aromatic diamines so far as it is selected so that it is polymerized with a dicarboxylic acid to form a polyamide having a melting point above 230° C. in the fiber forming molecular weight range. Typical examples thereof are ethylenediamine,
propylenediamine,
tetramethylenediamine,
pentamethylenediamine,
hexamethylenediamine,
heptamethylenediamine,
octamethylenediamine,
p-xylenediamine,
1-methyl-2,4-aminobenzene,
p-phenylenediamine,
1,4-diaminocyclohexane,
bis-(p-aminocyclohexyl)-methane,
N,N'-dimethyl tetramethylenediamine,
N,N'-dimethyl-p-xylenediamine,
N,N'-dimethyl-1,4-diaminocyclohexane,
piperadine,
trans-2,5-dimethyl piperadine, etc., and substances related thereto Several of these diamines will be detailed in the examples shown later and mixtures of such diamines are usable as well. Further, derivatives of said diamines which have non-functional substituents can either be used so far as the substituents do not disturb the polymerization. Examples thereof are those having, for example, hydrocarbon chains, or containing halogen, nitro groups or ether linkage-containing groups and said diamines substituted by groups inert under the production conditions of the present invention. Bifunctional carboxylic acid compounds or polyamide-forming derivatives are used as diacid for said diamines. These include, for example, aliphatic aromatic and alicyclic carboxylic acids, heterocyclic dicarboxylic acids and acid chlorides thereof. Further, a mixture of several said dicarboxylic acids may also be used in co-polymerized. There are also used derivatives of said substances which are capable of forming polyamides. Examples of useful acids are adipic, suberic, oxalic, sebacic, terepthalic, hexahydroterephthalic, isophthalic, phthalic, biphenyl dicarboxylic acid, 1,5 - naphthalenedicarboxylic, 2,6 - naphthalenedicarboxylic and piperadineacetic acids. These acids are also usable in the form of derivatives substituted by groups taking no part in the reaction. What is most important here is that the above compounds are polymerized so as to form a polyamide having a melting point of above 230° C. within a fiber-forming molecular weight range. In such a sense, adipic, sebacic, terepthalic, hexahydroterephthalic and naphthalenedicarboxylic acids and derivatives thereof are particularly useful compounds. In this specification the expression fiber-forming molecular weight has frequently been used. This expression not necessarily means that the polymer employed forms useful fibers but signifies a molecular weight capable of forming fibrous substances. It is noted that the above expression has merely been used in order to define the concept of molecular weight in another way.

Further embodied examples formed by the combination of the aforesaid dicarboxylic acids and diamines are shown in Table 1. These are a part of the high melting point chains to be used in the method of the present invention. Of course, the scope of the method of the present invention is not limited thereto but there are very many structure chains such as their derivatives or compounds related therewith. When these polymer molecular chains are used as the second chains and are subjected to block copolymerization with the first chains, the experimental conditions are selected so that the dicarboxylic acids are made present in excess and both terminals of the high molecular chain may be occupied by same active groups such as carboxylic acid groups.

Furthermore, when a high molecular chain constituted by the repetition of the aforesaid urea linkage is to be used as the high melting point segment, it can be readily prepared according to such conventional processes as carried out by heating said diamine compounds, employed as the starting material, in the presence of urea, by reacting the compound with phosgene in the presence of alkali or by reacting the same with isocyanate. Examples of said polyurea molecular chains which are preferentially used in practicing the method of the present invention are shown in Table 2.

TABLE 1

| Structure of high molecular chain | M.P., °C. |
|---|---|
| $-[-NH-(CH_2)_3-NHCO-(CH_2)_3CO-]_n-$ | 254 |
| $-[-NH-(CH_2)_4-NHCO-(CH_2)_m-CO-]_n-$ | |
| m=2 | 284 |
| m=5 | 236 |
| m=6 | 250 |
| m=7 | 240 |
| m=8 | 235 |
| $-[-NH-(CH_2)_6-NHCO-(CH_2)_m-CO-]_n-$ | |
| m=3 | 240 |
| m=4 | 250 |
| $-[-NH-(CH)-NHCO-\langle C_6H_4 \rangle-CO-]_n-$ | 350 |
| $-[-NH-(CH_2)_6-NHCO-\langle C_6H_4 \rangle-\langle C_6H_4 \rangle-CO-]_n-$ | 360 |
| $-[-NH-(CO_2)_6-NHCO-CH_2-O-\langle C_6H_4 \rangle-O-CH_2-CO-]_n-$ | 250 |
| $-[-NH-(CH_2)_8-NHCO-(CH_2)_4-CO-]_n-$ | 237 |
| $-[-NH-(CH_2)_{10}-NHCO-(CH_2)_4-CO-]_n-$ | 238 |
| $-[-NH-(CH_2)_{12}-NHCO-CH_2-\langle C_6H_4 \rangle-CH_2CO-]_n-$ | 242 |
| $-[-NH-(CH_2)_{10}-NHCO-(CH_2)_2-\langle C_6H_4 \rangle-(CH_2)_2-CO-]_n-$ | 265 |
| $-[-N(CH_2CH_2)_2N-NH-CO(CH_2)_4-CO-]_n-$ | 340 |
| $-[-N(CH_2CH_2)_2N-N-CO-(CH_2)_3-CO-(CH_2)_5-CO-]_n-$ | 350 |
| $-[-N(CH_2CH_2)_2N-N-CO-(CH_2)_6-CO-]_n-$ | 300 |

TABLE 1—Continued

| Structure of high molecular chain | M.P., °C. |
|---|---|
| $-\left[-N\underset{CH_2-CH_2}{\overset{CH_2-CH_2}{\diagup\diagdown}}N-CO-(CH_2)_3-CO-(CH_2)_5-CO-\right]_n-$ | 350 |
| $-\left[-N\underset{CH_2-CH_2}{\overset{CH_2-CH_2}{\diagup\diagdown}}N-CO-(CH_2)_3-CO-(CH_2)_4-CO-\right]_n-$ | 300 |
| $-\left[-NH-\langle H \rangle-NHCO-(CH_2)_4-CO-\right]_n-$ | 350 |
| $-\left[-NH-\langle H \rangle-CH_2-\langle H \rangle-NHCO-(CH_2)_3-CO-\right]_n-$ | 280 |
| $-\left[-NH-\langle H \rangle-CH_2-\langle H \rangle-NHCO-(CH_2)_4-CO-\right]_n-$ | 310 |
| $-\left[-NH-\langle \phantom{H} \rangle-NHCO-(CH_2)_4-CO-\right]_n-$ | 400 |
| $-\left[-N\underset{CH_2-CH_2}{\overset{CH_2-CH_2}{\diagup\diagdown}}N-CO-\langle \phantom{H} \rangle-CO-\right]_n-$ | 350 |
| $-\left[-NHCH_2-\langle \phantom{H} \rangle-CH_2-NHCO-(CH_2)_m-CO-\right]_n-$ | |
| $\quad m=3$ | 260 |
| $\quad m=4$ | 280 |
| $\quad m=5$ | 265 |
| $\quad m=6$ | 285 |
| $\quad m=7$ | 260 |
| $\quad m=16$ | 235 |
| $\quad m=20$ | 235 |
| $-\left[-NH-CH_2-\langle \phantom{H} \rangle-CH_2-NH-CO-\langle \phantom{H} \rangle-CO-\right]_n-$ | 243 |
| $-\left[-NH-CH_2-\langle \phantom{H} \rangle-CH_2-NHCO(CH_2)_4-CO-\right]_n-$ | 243 |
| $-\left[-NHCH_2-CH_2-\langle \phantom{H} \rangle-CH_2-CH_2-NHCO-(CH_2)_m-CO-\right]_n-$ | |
| $\quad m=4$ | 310 |
| $\quad m=7$ | 250 |
| $\quad m=8$ | 285 |
| $-\left[-NH-\langle \phantom{H} \rangle-\langle \phantom{H} \rangle-NHCO-(CH_2)_4-CO-\right]_n-$ | 395 |
| $-\left[-NH-\langle \phantom{H} \rangle-\langle \phantom{H} \rangle-NHCO-(CH_2)_3-CO-\right]_n-$ | 435 |
| $-\left[-NH-\langle \phantom{H} \rangle-CH_2-\langle \phantom{H} \rangle-NH-CO-(CH_2)_m-CO-\right]_n-$ | |
| $\quad m=4$ | 400 |
| $\quad m=8$ | 360 |
| $-\left[-NH-\langle \overset{CH_3}{\phantom{H}} \rangle-CH_2-\langle \overset{CH_3}{\phantom{H}} \rangle-NH-CO-(CH_2)_4-CO-\right]_n-$ | 324 |
| $-\left[-NH-\langle \overset{CH_3}{\phantom{H}} \rangle-CH_2-\langle \overset{CH_3}{\phantom{H}} \rangle-NH-CO-\langle \phantom{H} \rangle-CO-\right]_n-$ | 380 |
| $-\left[-NH-\langle \phantom{H} \rangle-CH_2-CH_2-\langle \phantom{H} \rangle-NHCO-(CH_2)_8-CO-\right]_n-$ | 360 |
| $-\left[-NH-(CH_2)_3-O-(CH_2)_3-NHCO-\langle \phantom{H} \rangle-CO-\right]_n-$ | 384 |
| $-\left[-NH-(CH_2)_3-O-(CH_2)_3-NHCO-\langle \phantom{H} \rangle-O-CH_2-CH_2-O-\langle \phantom{H} \rangle-CO-\right]_n-$ | 250 |

TABLE 1—Continued
| Structure of high molecular chain | M.P., °C.[1] |
|---|---|
| 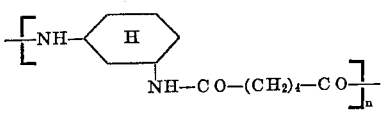 | 300 |
| 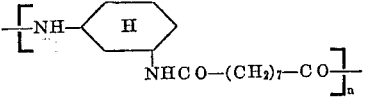 | 300 |
| 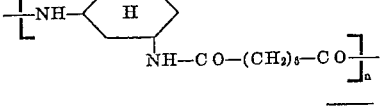 | 290 |
| 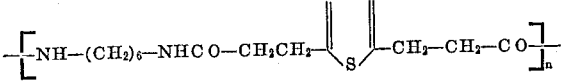 | 232 |
| 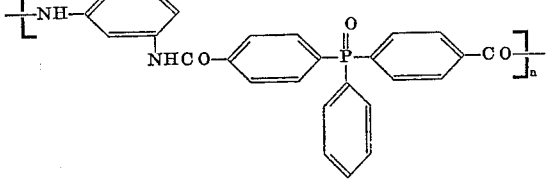 | 340 |
| 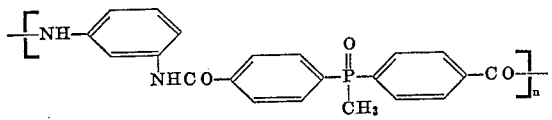 | 240 |
| 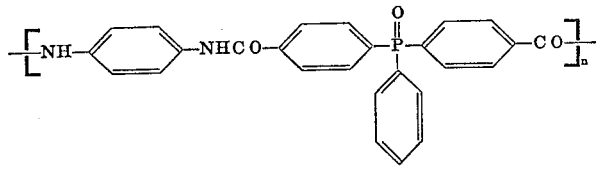 | 340 |
| 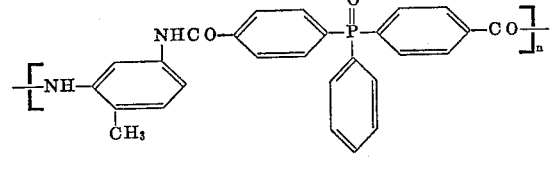 | 280 |
| 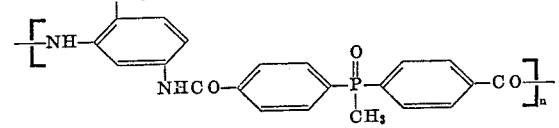 | 242 |
| 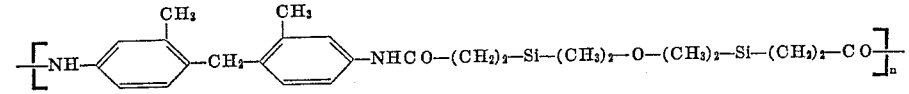 | 265 |
| 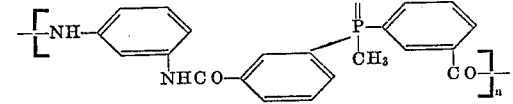 | 258 |
[1] Melting point in the fiber-forming range.

TABLE 2

| Structure of high molecular chain | | M.P., °C.[1] |
|---|---|---|
| $-[-NH-R-NHCO-]_n-$ | | |
| R = $-(CH_2)_2-$ | | >400 |
| R = $-(CH_2)_3-$ | | 248 |
| R = $-(CH_2)_4-$ | | 352 |
| R = $-(CH_2)_5-$ | | 270 |
| R = $-(CH_2)_6-$ | | 300 |
| R = $-(CH_2)_8-$ | | 260 |
| R = $-(CH_2)_9-$ | | 235 |
| R = $-(CH_2)_{10}-$ | | 235 |
| R = $-\langle\phantom{O}\rangle-CH_2-\langle\phantom{O}\rangle-$ | | 300 |
| $-[-NH-R-NHCONH-R'-NH-CO-]_n-$ | | |
| R = $-(CH_2)_2-$ | R' = $-(CH_2)_3-$ | 2 3 |
| R = $-(CH_2)_2-$ | R' = $-(CH_2)_4-$ | 248 |
| R = $-(CH_2)_2-$ | R' = $-(CH_2)_6-$ | 238 |
| R = $-(CH_2)_4-$ | R' = $-(CH_2)_5-$ | 266 |
| R = $-(CH_2)_4-$ | R' = $-(CH_2)_6-$ | 256 |
| R = $-(CH_2)_4-$ | R' = $-\langle\phantom{O}\rangle-$ | >330 |
| R = $-(CH_2)_4-$ | R' = $-\langle\phantom{O}\rangle-$ (meta) | >310 |
| R = $-(CH_2)_4-$ | R' = $-\langle\phantom{O}\rangle-\langle\phantom{O}\rangle-$ | 236 |
| R = $-(CH_2)_6-$ | R' = $-(CH_2)_6-$ | 235 |
| R = $-(CH_2)_3-$ | R' = $-\langle\phantom{O}\rangle-$ | >330 |
| R = $-(CH_2)_4-$ | R' = $-\langle\phantom{O}\rangle-$ (meta) | >310 |
| R = $-(CH_2)_6-$ | R' = $-(CH_2)_6-$ | 235 |
| R = $-(CH_2)_8-$ | R' = $-\langle\phantom{O}\rangle-$ (meta) | >310 |
| R = $-\langle\phantom{O}\rangle-$ | R' = $-\langle\phantom{O}\rangle-$ (meta) | >340 |
| R = $-\langle\phantom{O}\rangle-$ with $-CH_3$ | R' = $-\langle\phantom{O}\rangle-O-\langle\phantom{O}\rangle-$ | 320 |
| R = $-\langle anthracene\rangle(CH_2)_2\langle\rangle-$ | R' = $-(CH_2)_6-$ | 294 |

[1] Melting point in the fiber-forming range.

The value of n shown in respective structural formulas tabulated above is directly connected with the molecular weight of each polymer molecular chain and means the repetition number. The n value of the chain used as the high melting point segment in practicing the method of the present invention is not so great, and ordinarily the value of about 1 to 10 is preferentially employed. It is natural that the length of the high melting point chains formed by condensation polymerization are not uniform in the polymer molecular chain blockwise combined with the first chain but have a specific distribution, and said values of n which are frequently employed, of course, signify average values. Further, not only the repetition of single groups, like most of those tabulated above, but a state in which the repetition of, for example, amide groups and urea groups are present in admixture can be easily synthesized, and it is needless to say that these can be equivalently used in practicing the method of the present invention. These high melting segments can be readily synthesized by optionally combining the respective structures shown above.

The soft molecular chain to be block copolymerized with such high melting point segment as mentioned above is, as detailed before, a molecular chain having diamines on both ends which has a second transition point of less than —30° C., is composed mainly of a polyether structure and contains a secondary amine in the molecular chain. A factor which is to be particularly emphasized as a characteristic of the method of the present invention is that the secondary amine is contained, in average, from 2 to 20 equivalent percent, preferably from 3 to 15 equivalent percent, of the total amine. The effect of inclusion of secondary amine is clearly indicated by comparing the properties of a block copolymer prepared from an $\alpha,\omega$-diaminopolyalkylene oxide containing a secondary amine with those of a block copolymer obtained from an $\alpha,\omega$-diaminopolyalkylene oxide containing no secondary amine at all.

A mixed liquid comprising 85% of tetrahydrofuran and 15% of ethylene oxide was polymerized in the presence of a catalyst composed of antimony pentoxide and thionyl chloride and was then subjected to heat treatment to obtain and $\alpha,\omega$-dichloropolyalkylene oxide having a molecular weight of 1980. The $\alpha,\omega$-dichloropolyalkylene oxide was reacted with potassium phthalimide and was then decomposed with hydrazine to prepare an $\alpha,\omega$-diaminopolyalkylene oxide entirely free from secondary amine.

On the other hand, the above-obtained $\alpha,\omega$-dichloropolyalkylene oxide of 100 parts and liquid ammonia of 10 to 500 parts were heated and stirred in a closed autoclave to synthesize $\alpha,\omega$-diaminopolyalkylene oxides containing from 1.8 to 19.9% equivalent of secondary amine based on the total amine.

Using these $\alpha,\omega$-diaminopolyalkylene oxides, there were prepared block copolymers comprising as a low melting point component of 77 weight percent and of a high melting point component 23 weight percent based on the block copolymer thereof. The preparation was conducted according to such polymerization process that metacresol was added as a solvent to a mixture of the starting materials, the mixture was heated, thereafter the solvent was removed by distillation and then the mixture was heated under reduced pressure.

Each of these polyamides was subjected to melt spinning at a temperature of about 240° C., was stretched to 3 times and was then taken up to obtain filaments.

These polyamides and the properties of filaments made therefrom will be shown in the following table:

| Experiment No. | 1 | 2 | 3 | 4 | 5 | 6 |
|---|---|---|---|---|---|---|
| Secondary amine content (percent based on total amine) | 0 | 1.8 | 3.0 | 6.3 | 15.2 | 19.9 |
| Reduction viscosity of block copolymer | 2.0 | 1.8 | 2.2 | 1.9 | 1.9 | 1.8 |
| Strength (room temp.) (g./d.) | 0.55 | 0.72 | 0.63 | 0.47 | 0.49 | 0.55 |
| Elongation (room temp.), percent | 450 | 430 | 570 | 600 | 390 | 400 |
| Elastic recovery (room temp.), percent | 91 | 94 | 93 | 95 | 90 | 95 |
| Strength (100° C.) (g./d.) | 0.20 | 0.27 | 0.30 | 0.35 | 0.30 | 0.33 |
| Filament: | | | | | | |
| Elongation (100° C.), percent | 400 | 380 | 360 | 450 | 390 | 390 |
| Elastic recovery (100° C.), percent | 63 | 77 | 91 | 93 | 89 | 95 |
| Elastic recovery (−10° C.), percent | 51 | 69 | 90 | 91 | 93 | 90 |
| Dye receptivity Supramine Blue-R 4% OWF, percent | 9 | 26 | 38 | 68 | 100 | 100 |

Reduced viscosity was measured by dissolving a sample in metacresol at 35° to a concentration of 0.2 g./100 cc.
Elastic recovery was measured by stretching a sample for one minute and then relaxing for one minute.

From the above table, it is understood that filaments obtained from block copolymers prepared using as starting materials secondary amine-containing $\alpha,\omega$-diaminopolyalkylene oxides are excellent in strength and elastic recovery at a relatively elevated temperature, i.e., 100° C., as well as in elastic recovery at such a low temperature as −10° C., and show high dye receptivity for acid dyes.

However, most of the block copolymers prepared from secondary amine-containing $\alpha,\omega$-diaminopolyalkylene oxides frequently accompanying coloration. This tendency is particularly marked when such adiamine as containing more than 15% of secondary amine based on the total amine.

The amount of secondary amine contained in the molecular chain depends upon the molar ratio of ammonia to terminal chlorine atoms of a $\alpha,\omega$-dichloropoly-alkylene oxide. It is particularly desirable in practicing the method of the present invention to effect the ammonolysis of $\alpha,\omega$-dichloropolyalkylene oxide while controlling the partial pressure of ammonia to more than 30 kg./cm.$^2$ and preferably less than 110 kg./cm.$^2$. The amount of secondary amine contained in the molecular chain more or less varies depending upon other reaction conditions. For example, lowering in reaction temperature rather increases the content of secondary amine, and reduction in stirring velocity makes the formation of secondary amine uneven and tends to increase the content in average. The amounts of total amine and secondary amine contained in the molecular chain can be easily estimated according to the ordinary known processes. For example, the amount of total amine can be estimated according to a process carried out by dissolving a sample in methanol and titrating the solution with an isopropyl alcohol solution containing hydrochloric acid at 1/10 N concentration. Further, the amount of secondary amine can be estimated according to a process conducted by adding salicylaldehyde to a methanol solution of a sample to mask primary amine and then subjecting the solution to acid titration in the same manner as above.

In order to provide in the most preferable state said polyethers used as starting materials in the preparation of block copolymerized elastomers, considerably careful considerations should be paid in practice. For example, in case a copolymerized polyether is to be used as the soft molecular chain, it is desirable, in view of the prevention of polymer from coloration, to adopt in the polymerization of cyclic ether a process effected by forming a complex of more than four-membered cyclic ether and catalyst at below 0° C., preferably below −5° C., adding to the complex a three-membered cyclic ether and then subjecting the complex to polymerization under conditions described below. In practice, there is frequently adopted such a continuous polymerization process as effected by mixing in the polymerization system the three-membered cyclic ether with the complex of more than four-membered cyclic ether and catalyst. In the polymerization of cyclic ethers containing no three-membered cyclic ether, no such considerations are required. The polymerization temperature is restricted from the side of the properties of the resulting polymer. For example, when 0.2% of antimony pentachloride is used and the polymerization temperature is elevated to 45° C., a coloration reaction is obviously induced, though this is dependent also on the amount of catalyst employed in the polymerization system, and becomes marked with increasing polymerization temperature, i.e., at 50° C. yellow or pale brown, at 60° C. brown and at 70° C. dark brown. In case the amount of antimony pentachloride employed is made smaller, the extent of coloration reduces and when the amount is 0.02%, for example, no coloration is observed even at 50° C. In such a case, however, the rate of polymerization reaction is greatly lowered and therefore, in case a polymer is intended to be obtained at a desired conversion, there occurs such a drawback that a long polymerization reaction time is required. Further, when the polymerization temperature is maintained at such a high temperature as above 50° C., though the temperature somewhat varies depending on the amount of catalyst, there occurs the termination of polymer growth reaction, due to dehydrogenation ion reaction in the course of polymerization, to form terminal double bonds, whereby it becomes impossible to provide a starting material for the preparation of polyether having diamines on both ends which is at such a high purity as aimed at in accordance iwth the method of the present invention. As another drawback brought about by the increase in polymerization temperature, the formation of branched structure should be additionally raised. The stoppage (termination) of polymerization reaction is effected by addition of a compound having action to extinguish the catalyst activity of antimony pentachloride, such as for example, ammonia, water, active alumina, caustic soda, caustic potash, organic amine, etc. However, particularly preferred compounds are alkaline substances having actions to combine or react not with thionyl chloride but with only antimony pentachloride to extinguish its activity, e.g., pyridine compounds such as pyridine, picoline and quinoline, tricethylamine compounds such as trimethylamine, triethylamine, trioctylamine and N-methyl pyrrolidine, and N,N'-dialkyl-substituted amide compounds such as N-methyl pyrrolidone, N-propyl pyrrolidone, N-methyl-δ-valerolactam and N,N'-dimethyl acetamide. These compounds have no active hydrogen which undesirably reacts with thionyl chloride and show basicity to antimony pentachloride. The above compounds are desirably used in an amount equivalent to, or in slight excess of, the moles of the antimony pentachloride present.

After extinguishing the activity of antimony pentachloride by means of such alkalis as mentioned above, the reaction system is heated in the presence of thionyl chloride to obtain an α,ω-dichloropolyalkylene oxide, as mentioned above. However, when a monomer mixture containing a three-membered cyclic ether is subjected to polymerization reaction, thionyl chloride has substantially been consumed and hence a fresh thionyl chloride should be added. The amount of thionyl chloride to be freshly-added varies depending upon the extent of progress of polymerization reaction or the like conditions, but when the polymerization reaction has sufficiently been effected, the amount thereof is desirably from 50 to 100% based on the amount of the thionyl chloride which has initially been added as a catalyst. When cyclic ethers containing no three-membered cyclic ether are subjected to polymerization, the addition of fresh thionyl chloride is scarcely required, in general. That is, the reaction is effected in such a state that thionyl chloride to be consumed in decomposition reaction is at least present in the system. The treatment temperature is ordinarily from 60° to 100° C. The heating time is dependent upon the heating temperature and, when the temperature is 60° C., the reaction is required to be effected for 10–50 hours, preferably 15–25 hours, and when the temperature is 80° C. the reaction time is required to be 1–25 hours, preferably 2–5 hours. When the reaction temperature is elevated to 100° C., the reaction time is further shortened and the reaction is effected for 30 minutes to 10 hours, preferably 1–5 hours. Of course, the heating may be effected for a longer period than the above range, but heating after completion of the reaction has no particular significance.

The invention will be fully illustrated with reference to the following examples:

EXAMPLE 1

In this example, there was used a 200 cc. three-necked flask provided with a thermometer, a stopper and an air-cooling pipe having a tip attached with a volley-ball tube. The volley ball tube was filled with nitrogen gas and was stopped with a cock. Into the flask, the rotor of a magnetic stirrer was inserted. 85 g. of purified tetrahydrofuran was charged in the flask and the cock of the tube was opened and the nitrogen gas was blown into the flask to effect nitrogen substitution. After being tightly stoppered, the flask was cooled to −5° C. in a Dry Ice-methanol bath. Thereafter, the cock of the tube was closed, and a mixed liquid comprising 27 g. of thionyl chloride and 0.1 g. of antimony pentachloride which had been prepared at room temperature was added to the flask and then 15 g. of ethylene oxide taken out of a bomb was further added. Subsequently, the cock of the tube was opened to substitute the flask with nitrogen. The flask was tightly stoppered, transferred into a water bath, heated to 20° C. and maintained at said temperature for 2 hours, while stirring the mixture with the magnetic stirrer, to effect polymerization. Thereafter, 0.1 cc. of pyridine was added to the flask to cease the polymerization. After adding 27 g. of thionyl chloride to the flask, a reflux condenser was provided between the air cooling pipe and the flask, and the flask was nitrogen-substituted, heated to 75° C. over a warm bath and was maintained at said temperature for 6 hours. To the flask, about 0.2 g. of active carbon was added at said temperature, and a small amount of sodium bicarbonate was further added thereto to decompose excess thionyl chloride. The reaction liquid was cooled to room temperature and was filtered, and the filtrate was dried to obtain 62 g. of an α,ω-dichloropolyalkylene oxide. This oxide contained 3.54% of chlorine and had an average molecular weight of 2003.

60 g. of the α,ω-dichloropolyalkylene oxide and 100 g. of liquid ammonia were charged in a 500 cc. autoclave provided with a stirring means, and the mixture was heated at 100° C. for 12 hours, while being stirred in a confined state, and was then cooled near to room temperature to discharge ammonia. The content of the autoclave was taken out and was dissolved in either, and the solution was filtered to remove insolubles. The filtrate was incorporated with about 2 g. of soda lime and the liquid was stirred overnight. The liquid was then filtered and the filtrate was dried to obtain 57 g. of an α,ω-diaminopolyalkylene oxide. This polymer was estimated according to acid titration in the same manner as mentioned before to find that it contained 0.975 meq./g. of primary amine and 0.029 meq./g. (3.0% equivalent of total amine) of secondary amine, and had an average molecular weight of 2,050.

7.52 g. of said diamine, 0.540 g. of adipic acid, 1.84 g. hexamethylenediamine adipate and 8 cc. of metacresol as a solvent were charged in a polymerization ampoule. After repeating nitrogen injection and evacuation several times, the ampoule was finally sealed under reduced pressure and was heated at 230° C. for 3 hours. After cooling, the ampoule was opened and was heated for 3 hours in an oil bath at 250° C., while introducing nitrogen through a capillary tube, to distill metacresol. Subsequently, the ampoule was elevated in temperature to 260° C., was maintained at said temperature for one hour, and was then heated at 260° C. for 2 hours under a reduced pressure of about 0.1 mm. Hg, to obtain a polyamide.

The polyamide thus obtained showed a reduced viscosity of 2.2, when the measurement of reduced viscosity was carried out by dissolving 0.2 g. of the polymer in 100 cc. of metacresol at 35° C., and contained 78 weight percent of a low melting portion as the first chain. The polymer was extruded at 238° C. through a nozzle having a hole of 0.5 mm. in diameter, was thus subjected to melt spinning at a draft of 20 times, was stretched to 3 times and was taken up. The resulting filament had a tensile strength of 0.51 g./d., a tensile elongation of 480% and an initial Young's modulus of 0.2 g./d. The filament showed an elastic recovery of 92% when measured by stretching to 50%, maintaining the stretched state for one minute and then relaxing the stretched state for one minute, and showed a residual stress of 83% when measured by stretching to 50% and maintaining the stretched state for one minute. The filament had a sticking temperature of 220° C.

EXAMPLE 2

6.83 g. of the α,ω-diaminopolyalkylene oxide obtained in Example 1, 0.680 g. of sebacic acid, 2.51 g. of paraxylylenediamine sebacate and 8 cc. of methacresol as a solvent were charged in a polymerization ampoule. After repeating nitrogen injection and evacuation several times, the ampoule was sealed under reduced pressure and was heated at 230° C. for 3 hours. After cooling, the ampoule was opened, was provided with a capillary tube and was heated in an oil bath at 260° C., while introducing nitrogen through a capillary tube, to distill the metacresol. Subsequently, the ampoule was elevated in temperature to 270° C., was maintained at said temperature for one hour, and was heated at 270° C. for 2 hours under a reduced pressure of about 0.1 mm. Hg, to obtain a polyamide.

The thus obtained polyamide showed a reduced viscosity of 1.8 when measured according to the aforesaid means and contained 70% by weight of a low melting portion as the first chain.

The polymer was subjected to melt spinning at 250° C. in the same manner as in Example 1, was stretched to 3 times and was taken up. The resulting filament had a tensile strength of 0.62 g./d., a tensile elongation of 370% and an initial Young's modulus of 0.1 g./d., and showed an elastic recovery of 95% and a residual stress of 85%, when measured in the same manner as in Example 1. The sticking temperature of the filament was 230° C.

EXAMPLE 3

Substantially the same operations as in Example 1 were conducted using the same apparatus for preparing α,ω-dichloropolyalkylene oxide as in Example 1, except that a dropping funnel filled with thionyl chloride was employed to drop the chloride during the polymerization. That is, 70 g. of purified tetrahydrofuran was cooled to −15° C. To the tetrahydrofuran, a mixed liquid comprising 5 g. of thionyl chloride and 0.5 g. of antimony pentachloride was added, and then 30 g. of ethylene oxide was added. The mixture was elevated in temperature to −5° C. and was maintained at said temperature for 40 hours. During said 40 hours 40 g. of thionyl chloride was added at a rate of 1 g. per hour, and the mixture was polymerized. Thereafter 0.5 cc. of pyridine was added to the mixture to cease the polymerization. A reflux condenser was provided between the air cooling pipe and the flask, and the flask was nitrogen-substituted, was heated to 70° C., and was maintained at said temperature for 10 hours. To the flask, about 1 g. of active carbon was added, and further a small amount of sodium bicarbonate was added thereto decompose excess thionyl chloride. Subsequently, the reaction liquid was cooled to room temperature and was filtered, and the filtrate was dried to obtain 79 g. of an α,ω-dichloropolyalkylene oxide. This oxide contained 13.8% of chlorine and had an average molecular weight of 508.

75 g. of the α,ω-dichloropolyalkylene oxide and 60 g. of liquid ammonia were charged in a 500 cc. autoclave, and the mixture was heated at 110° C. for 10 hours, while being stirred in a confined state, and was cooled to discharge ammona. The content of the autoclave was taken out and was dissolved in ether, and the solution was filtered to remove insolubles. To the filtrate, about 2 g. of soda lime was added, and the liquid was stirred overnight.

Thereafter, the liquid was filtered and the filtrate was dried to obtain 70 g. of an α,ω-diaminopolyalkylene oxide. This polymer was estimated according to acid titration in the same manner as mentioned before to find that it contained 3.99 meq./g. of primary amine and 0.46 meq./g. (10.4 equivalent percent of the total amine) of secondary amine, and had an average molecular weight of 502.

7.9 g. of said diamine, 2.74 g. of suberic acid and 6.00 g. of piperidine suberate were charged in a polymerization ampoule. After nitrogen substitution, the ampoule was sealed under reduced pressure and was heated at 230° C. for 7 hours. After cooling, the ampoule was opened, and was heated for 2 hours in an oil bath at 220° C., while introducing nitrogen through a capillary tube. Subsequently, the ampoule was elevated in temperature to 250° C., was maintained at said temperature for one hour, and was then heated at 250° C. for 3 hours under a reduced pressure of about 0.1 mm. Hg. to obtain a polyamide.

The thus obtained polyamide showed a reduced viscosity of 1.59 when measured by the aforesaid means, and contained 50% by weight of a low melting portion as the first chain.

The polyamide was subjected to melt spinning in the same manner as in Example 1, was stretched to 3 times and was then taken up. The resulting filament had a tensile strength of 0.70 g./d., a tensile elongation of 115% and an initial Young's modulus of 0.2 g./d., and showed an elastic recovery of 92% and a residual stress of 87% under the aforesaid conditions.

EXAMPLE 4

The same polymerization operations as in Example 1 were carried out using the same apparatus as employed in Example 1. That is, 72 g. of purified tetrahydrofuran was cooled to −15° C. To the tetrahydrofuran, a mixed liquid comprising 12.2 g. of thionyl chloride and 0.14 g. of antimony pentachloride was added, and then 72 g. of propylene oxide was added. The mixture was elevated in temperature to 20° C. and was maintained for 2 hours at said temperature to effect polymerization, and then 0.14 cc. of pyridine was added thereto to cease the polymerization. Subsequently, 12.2 g. of thionyl chloride was added to the flask, and the flask was provided with a reflux condenser, was nitrogen-substituted, was heated to 73° C. and was maintained at said temperature for 7 hours. Thereafter, about 1 g. of active carbon was added, and further a small amount of sodium bicarbonate was added to decompose excess thionyl chloride. The reaction liquid was cooled to room temperature and was filtered, and the filtrate was dried to obtain 84 g. of an α,ω-dichloropolyalkylene oxide. This oxide contained 9.1% of chlorine and had an average molecular weight of 780.

50 g. of the α,ω-dichloropolyalkylene oxide and 120 g. of liquid ammonia were charged in a 500 cc. autoclave, and the mixture was heated at 120° C. for 10 hours, while being stirred in a confined state, and was then cooled to discharge ammonia. The content of the autoclave was taken out and was dissolved in ether, and the solution was filtered to remove insolubles. To the filtrate, about 2 g. of soda lime was added and the liquid was stirred overnight. The liquid was then filtered and the filtrate was dried to obtain 47 g. of an α,ω-diaminopolyalkylene oxide. This polymer was estimated according to the acid titration as mentioned before to find that it contained 2.73 meq./g. of primary amine and 0.144 meq./g. (5 equivalent percent of the total amine) of secondary amine, and an average molecular weight thereof was 722.

10.5 g. of said diamine and 0.98 g. of ethylene-diamine were charged in a three-mouthed flask together with dimethyl-acetamide. After nitrogen substitution, the flask was cooled with Dry Ice and acetone, and then 5.65 g. of adipoyl chloride was added. The Dry Ice bath was changed to an ice bath and stirring was continued for one hour. The reaction liquid was poured with stirring into about 1 l. of water and was then filtered, water-washed and dried to obtain 12.9 g. of a polyamide.

This polyamide had a reduced viscosity of 21, when measured according to the aforesaid means, and contained 75% by weight of a low boiling portion as the first chain.

A metacresol solution of the thus obtained polyamide

EXAMPLE 5

7.32 g. of the $\alpha,\omega$-diaminopolyalkylene oxide obtained in Example 3, 4.48 g. of 4,4'-dicarboxyethyl diphenyl ether, 1.66 g. of 4,4'-dicarboxyethyl diphenyl ether (HOOCCH$_2$CH$_2$OOOCH$_2$CH$_2$COOH) hexamethylenediamine salt and 13 cc. of phenol as a solvent were charged in a polymerization ampoule. After nitrogen substitution, the ampoule was sealed under reduced pressure and was heated at 230° C. for 3 hours. After cooling, the ampoule was opened and was heated for 4 hours in an oil bath at 250° C., while introducing nitrogen through a capillary tube, to distill phenol. The ampoule was then heated at 250° C. for 2 hours under a reduced pressure of about 0.1 mm. Hg, to obtain a polyamide.

The thus obtained polyamide had a reduced viscosity of 1.83 and contained 55% by weight of a low melting portion as the first chain.

This polymer was subjected to melt spinning at 188° C. in the same manner as in Example 1, was stretched to 3 times and was taken up. The resulting filament had a tensile strength of 0.50 g./d., a tensile elongation of 240% and an initial Young's modulus of 0.1 g./d., and showed an elastic recovery of 90% and a residual stress of 81% under the aforesaid conditions.

EXAMPLE 6

5.0 g. of the $\alpha,\omega$-diaminopolyalkylene oxide obtained in Example 1, 1.3 g. of triethylamine and 0.383 g. of phenylenediamine were dissolved in 200 g. of methylene chloride in a 500 cc. conical flask provided with a stopper. Subsequently, 1.215 g. of isophthaloyl chloride in 200 g. of methylene chloride was added and the flask was shaken by hand to agitate the content. After 10 minutes, the polymerization was complete, and a polyamide was precipitated by addition of hexane in a same volume as that of the reaction liquid.

The thus obtained polyamide had a reduced viscosity of 2.75 and contained 80% by weight of a low melting portion as the first chain.

This polymer was dissolved to a concentration of 20% by weight in dimethylformamide containing 5% of lithium chloride. The solution was extruded and spun through a nozzle having 100 holes of 0.1 mm. in diameter into water at 20° C., was stretched to 3 times and was taken up. The resulting filament had a tensile strength of 0.32 g./d., a tensile elongation of 620% and an initial Young's modulus of 0.15 g./d., and showed an elastic recovery of 98% and a residual stress of 92%. The sticking temperature of the filament was above 270° C.

EXAMPLE 7

8.1 g. of the $\alpha,\omega$-diaminopolyalkylene oxide obtained in Example 1, 3.00 g. of bis-(paracarboxyphenyl)-sulfone, 0.680 g. of hexamethylenediamine and 10 cc. of metacresol as a solvent were charged in a polymerization ampoule. After nitrogen substitution, the ampoule was sealed under reduced pressure and was heated at 230° C. for 3 hours. After cooling, the ampoule was opened and was heated for 3 hours in an oil bath at 260° C., while introducing nitrogen through a capillary tube, to distill metacresol. Subsequently, the ampoule was elevated in temperature to 285° C., was maintained at said temperature for one hour, and was then heated at 285° C. for one hour under a reduced pressure of about 0.1 mm. Hg, to obtain a polyamide.

The thus obtained polyamide showed a reduced viscosity of 2.3 when measured according to the aforesaid means and contained 70% by weight of a low melting portion as the first chain.

This polymer was subjected to melt spinning at 270° C. in the same manner as in Example 1, was stretched to 3 times and was taken up. The sticking temperature of the resulting filament was 249° C.

EXAMPLE 8

The same polymerization operations as in Example 1 were carried out using the same apparatus as employed in Example 1. That is, 95 g. of purified tetrahydrofuran was cooled to −5° C. To the tetrahydrofuran, a mixed liquid comprising 20 g. of thionyl chloride and 0.3 of antimony pentachloride was added and then 5 g. of cyclooxabutane was further added. The mixture was elevated in temperature to 27° C. and was maintained at said temperature for 20 hours, and then 0.1 cc. of pyridine was added thereto. A reflux condenser was attached to the flask, and the flask was nitrogen-substituted and was then heated at 80° C. for 3.5 hours. To the flask, about 0.3 g. of active carbon was added, and a small amount of sodium bicarbonate was further added to decompose excess thionyl chloride. Thereafter, the reaction liquid was cooled to room temperature and was filtered, and the filtrate was dried to obtain 60 g. of an $\alpha,\omega$-dichloropolyalkylene oxide. This oxide contained 2.22% of chlorine and had an average molecular weight of 3,150.

55 g. of the $\alpha,\omega$-dichloropolyalkylene oxide and 10 g. of liquid ammonia were charged in a 100 cc. autoclave, and the mixture was heated at 120° C. for 10 hours, while being stirred in a confined state, and was then cooled to discharge ammonia. The content of the autoclave was taken out and was dissolved in ether, and the solution was filtered to remove insolubles. To the filtrate, about 2 g. of soda lime was added, and the liquid was stirred overnight. Thereafter, the liquid was filtered and the filtrate was dried to obtain 50 g. of $\alpha,\omega$-diaminopolyalkylene oxide. This polymer was estimated according to the same acid titration as mentioned before to find that it had 0.64 meq./g. of primary amine and 0.052 meq./g. (7.4% by weight of total amine) of secondary amine, and the average molecular weight thereof was 3,120.

5.70 g. of said diamine, 2.31 g. of thiophene-2,5- di-$\beta$-propionic acid, 0.960 g. of hexamethylenediamine and 5 cc. of phenol as a solvent were charged in a polymerization ampoule. After nitrogen-substitution, the ampoule was sealed under reduced pressure and was heated at 230° C. for 2 hours. After cooling, the ampoule was opened, was heated for 5 hours in an oil bath at 230° C., while introducing nitrogen through a capillary tube, to distill phenol, and was then heated at 230° C. for 5 hours under a reduced pressure of about 1 mm. Hg., to obtain a polyamide.

The thus obtained polyamide had a reduced viscosity of 2.95 and contained 65% by weight of a low melting portion as the first chain.

This polymer was subjected to melt spinning at 210° C. in the same manner as in Example 1, was stretched to 3 times and was then taken up. The resulting filament had a tensile strength of 0.36 g./d., a tensile elongation of 320% and an initial Young's modulus of 0.2 g./d., and showed an elastic recovery of 97% and a residual stress of 92% under the aforesaid conditions. The sticking temperature of the filament was 202° C.

EXAMPLE 9

8.70 g. of the $\alpha,\omega$-diaminopolyalkylene oxide obtained in Example 4 and 2.02 g. of bis-(para-aminophenyl)-methane and 2.0 g. of triethylamine were charged, together with purified dimethyl acetamide, in a three-mouthed flask provided with a dropping funnel and a stirring means. After nitrogen-substitution, the flask was cooled with Dry Ice and acetone, and 4.50 g. of terephthaloyl chloride was added thereto. The Dry Ice bath was changed to an ice water bath and stirring was continued for one hour. In the same manner as in Example 6, the reaction solution was extruded and spun in water at 20° C., was stretched to 3 times and was then taken up. This polyamide had a reduced viscosity of 1.37 and contained 62% by weight of a low melting portion as the first chain.

The resulting filament had a tensile strength of 0.40 g./d., a tensile elongation of 250% and an initial Young's modulus of 0.12 g./d., and showed an elastic recovery of 93% and a residual stress of 88% under the aforesaid conditions. The sticking temperature of the filament was above 270° C.

EXAMPLE 10

Polymerization operations were carried out in the same manners as in Example 1. That is, 100 g. of purified tetrahydrofuran was cooled to −15° C. To the tetrahydrofuran, a mixed liquid comprising 30 g. of thionyl chloride and 0.3 g. of antimony pentachloride was added. The flask was elevated in temperature to 20° C., and was maintained at said temperature for 24 hours, and then 0.1 cc. of pyridine was added thereto. A reflux condenser was attached to the flask, and the flask was nitrogen-substituted and was heated at 75° C. for one hour and at 84° C. for 3.5 hours. Thereafter, about 0.3 g. of active carbon was added to the flask, and a small amount of sodium bicarbonate was further added to decompose excess thionyl chloride. Subsequently, the reaction liquid was cooled to room temperature and was filtered, and the filtrate was dried to obtain 60 g. of an $\alpha,\omega$-dichloropolyalkylene oxide. This polymer contained 1.23% of chlorine and had an average molecular weight of 5,770.

55 g. of the $\alpha,\omega$-dichloropolyalkylene oxide and 5 g. of liquid ammonia were charged in a 100 cc. autoclave, and the mixture was heated at 120° C. for 48 hours, while being stirred in a confined state, was cooled and was then treated in the same manner as in Example 8 to obtain 47 g. of an $\alpha,\omega$-diaminopolyalkylene oxide. This oxide was subjected to acid titration to find that it contained 0.34 meq./g. of primary amine and 0.06 meq./g. (15% of total amine) of secondary amine, and the average molecular weight thereof was 5,900.

11.0 g. of said diamine and 0.12 g. of $\gamma,\gamma'$-diamino-dipropylether and 2.5 g. of triethylamine were charged, together with purified dimethyl acetamide, in a three-mouthed flask provided with a dropping funnel and a stirring means. After nitrogen substitution, the flask was cooled in a Dry Ice-acetone bath, and then 0.565 g. of terephthaloyl chloride was added thereto. The Dry Ice bath was changed to an ice water bath and stirring was continued for one hour. Subsequently, the reaction liquid was poured with stirring into about 1 l. of water, and was then subjected to filtration, water-washing and drying to obtain 10.1 g. of an elastic polymer.

This polyamide showed a reduced viscosity of 1.9 when measured according to the aforesaid means and contained 95% by weight of a low melting portion as the first chain.

EXAMPLE 11

In this example, there was used a 1 l. five-mouthed flask provided with a stirring means, a thermometer, a dropping funnel, a temperature controller which actuates a circulation pump of cooling water through a relay, and an air cooling tube attached with a nitrogen-filled tube having a cock. Into the flask, 790 g. of purified tetrahydrofuran and 139 g. of ethylene oxide were charged, and the flask was nitrogen-substituted with nitrogen in the tube. The flask was cooled to 0° C. with Dry Ice, and a mixed liquid comprising 7.4 g. of thionyl chloride and 0.93 g. of antimony pentachloride which had been prepared at room temperature was added to the flask. The flask was again thoroughly nitrogen-substituted with nitrogen in the tube, was placed in a water bath in which cooling water was recycled, was elevated in temperature to 20° C. while stirring, and was maintained at said temperature by means of the temperature controller. At the same time, polymerization reaction was effected while adding through the dropping funnel 36 g. of thionyl chloride over a period of 2 hours at a rate of 3 g. per 10 minutes. After 2 hours, the dropping funnel and air cooling pipe were replaced by glass tubes, one of which is connected to a 100 cc. four-mouthed flask provided with a magnetic stirrer. The four-mouthed flask was cooled to −5° C. Into this flask, a mixed liquid comprising 85% by weight of tetrahydrofuran and 15% by weight of ethylene oxide was poured at a rate of 250 g./hr. by means of a pump feeder, and further a mixed liquid comprising 98.3% by weight of thionyl chloride and 1.7% by weight of antimony chloride was poured at a rate of 15 g./hr. by means of another pump. Further, another glass tube was connected to a 5 l. three-mouthed flask provided with a pyridine-introducing means and a stirrer (this flask had at the lower part an opening with a cock so that the content could be taken out). Thus, the cyclic ether and catalyst which had been mixed at −5° C. in the 100 cc. flask was introduced at said rate into the 1 l. polymerization vessel and then into the subsequent 5 l. flask to effect continuous polymerization which was to be stopped by addition of pyridine.

After continuing the above continuous polymerization for 20 hours, the injection of cyclic ether and catalyst was ceased and, at the same time, 0.5 cc. of pyridine was added to the 1 l. polymerization flask to discontinue the polymerization. The connected glass tube and the temperature controller were taken off and a reflux condenser was attached to the flask. To the tip of the reflux condenser, was attached a nitrogen-filled volley ball tube stopped with a cock. The flask was nitrogen-substituted, was heated to 75° C. over a water bath, was maintained at said temperature for 6 hours and was thus treated in the same manners as in Example 1 to obtain an $\alpha,\omega$-dichloropolyalkylene oxide. The conversion was 52% when the continuous polymerization had reached a steady state. The thus obtained $\alpha,\omega$-dichloropolyalkylene oxide contained 3.35% of chlorine and had an average molecular weight of 2,120.

60 g. of the $\alpha,\omega$-dichloropolyalkylene oxide and 100 g. of liquid ammonia were reacted in the same manner as in Example 1 to obtain 57 g. of an $\alpha,\omega$-diaminopolyalkylene oxide. This polymer was estimated according to the aforesaid acid titration to find that it contained 0.922 meq./g. of primary amine and 0.030 meq./g. (3.2% by weight of total amine) of secondary amine, and the average molecular weight thereof was 2,170.

8.04 g. of said diamine, 1.55 g. of adipic acid, 200 g. of hexamethylenediamine adipate and 8.5 cc. of metacresol as a solvent were treated in the same manners as in Example 1 to obtain a polyamide.

This polyamide had a reduced viscosity of 2.0 under the aforesaid measuring conditions and contained 78% by weight of a low melting portion as the first chain.

The thus obtained polyamide was subjected to melt-spinning at 148° C. in the same manner as in Example 1 to obtain a filament. The filament had a tensile strength of 0.72 g./d., a tensile elongation of 690% and an initial Young's modulus of 0.15 g./d., and showed an elastic recovery of 98% and a residual stress of 90%. The sticking temperature of the filament was 240° C.

EXAMPLE 12

15.2 g. of the $\alpha,\omega$-diaminopolyalkylene oxide obtained in Example 8, 3.40 g. of nonamethylenediamine, 1.58 g. of urea and 20 cc. of metacresol as a solvent were charged in a test tube. The test tube was heated at 130° C. for one hour, while introducing nitrogen through a capillary tube; and was then gradually brought to 200° C. for 1.5 hrs. Thereafter, the reaction liquid was heated at 260° C. for 2 hours, while distilling metacresol, to obtain a polyurea.

The thus obtained polyurea had a reduced viscosity of 2.7 and contained 78% by weight of a low melting portion as the first chain.

This polymer was subjected to melt-spinning at 240° C. in the same manner as in Example 1, was stretched to 3 times and was then taken up. The resulting filament had a tensile strength of 0.73 g./d., a tensile obligation of 390% and an initial Young's modulus of 0.2 g./d., and showed under the aforesaid conditions an elastic recovery of 98% and a residual stress of 94%. The sticking temperature of the filament was 225° C.

EXAMPLE 13

A thermometer and an an air-cooled tube are provided at a two-neck flask having a 1 l. content. A rubber tube for the volley-ball is provided at the top of the air-cooled tube. Then, the flask is filled with nitrogen. A screw cock is provided at the tube to adjust the nitrogen. Further, the rotor of magnetic stirrer is put in the flask. Then, 820 g. of purified tetrahydrofuran and 62 g. of thionyl chloride are placed in the flask. The flask is immersed in a Dry Ice-methanol bath, while the nitrogen substitution is effected, so as to lower the temperature to less than −30° C. Further, 1.9 g. of antimony pentachloride is added to the flask by a syringe, and then 145 g. of ethylene oxide is added thereto rapidly. Then, the flask is transferred to a water bath and agitated with the magnetic stirrer while cooled with water. Temperature is kept at 20° C. and polymerization is carried out for two hours. Then, 0.8 cc. of pyridine is added thereto, and the flask is agitated and warmed to 30° C. Unreacted monomer is removed in vacuum effected by an aspirator while the flask is warmed at 30° C. Then, 68 g. of thionyl chloride is added thereto, and the agitation is continued at 80° C. for five hours. Then, a small amount of activated carbon is added thereto, followed by the filtration. After drying in vacuum, 790 g. of $\alpha,\omega$-dichloroalkyl ether is obtained. This compound contains 6.33% of chlorine, and numerical average molecular weight thereof is 1,120. Charged into an agitating type autoclave having a 500 cc. content is 120 g. $\alpha,\omega$-dichloroalkyl ether thus obtained, and further 150 g. of liquid ammonia. Agitation is carried out at 70° C. for 102 hours in a tightly sealed state. Then, ammonia is vented. The remaining portion is transferred to a beaker and filtered by suction. Added to the filtrate is about 5 g. of soda lime granules. Agitation is carried out for 10 hours, and then the filtrate obtained again by filtration due to the suction is subjected to the drying. Thus, $\alpha,\omega$-diaminoalkyl ether is obtained. This compound is excellent in whiteness, exhibits the theoretical analytical value of nitrogen, and provides a good raw material for polycondensation.

EXAMPLE 14

Added to 100 g. of tetrahydrofuran are 20 g. of thionyl chloride and 0.5 g. of antimony pentachloride. Polymerization is carried out at 20° C. for 24 hours. Then, 0.17 g. of pyridine is added thereto. Heating is carried out to 75° C. for five hours. $\alpha,\omega$-dichloroalkyl ether having a number average molecular weight of 9,430 is obtained at 82% yield.

Charged into an autoclave having a 500 cc. content is 30 g. thereof, and further 20 g. of liquid ammonia and 15 cc. of tetrahydrofuran. Agitation is continued at 160° C. for three hours in a tightly sealed state, and then the content is left to cooling. After ammonia is vented, the residual portion is transferred to a beaker, whereto is added 100 cc. of tetrahydrofuran, followed by the filtration. Added to the filtrate is about 3 g. of soda lime granules, and the agitation is carried out for five hours. Then, the solvent is distilled off from the filtrate obtained again by the filtration, whereby 29 g. of $\alpha,\omega$-diaminoalkyl ether is obtained. This compound is excellent in whiteness, exhibits the theoretical analytical value of nitrogen, and provides a good raw material for polycondensation.

EXAMPLE 15

Added to 132 g. of tetrahydrofuran in the reaction vessel is 20 g. of thionyl chloride. The mixture is cooled in a Dry Ice bath and is added with 0.1 g. of antimony pentachloride at −30° C. Further, thereto are added 66 g. of ethylene oxide and 3 g. of 1-allyloxy-2,3-epoxy-propane. Then, the mixture is transferred to the water bath, and cooled with water, and subjected to agitation while the temperature is kept at 20° C. The polymerization is carried out for five hours, and then 1 cc. of pyridine is added to the resulting mixture, followed by agitation. Then, thereto is added 20 g. of thionyl chloride, followed by agitation at 75° C. for five hours. After drying in vacuum, 166 g. of $\alpha,\omega$-dichloropolyalkylene oxide is obtained. This polymer has a number average molecular weight of 608, and its chlorine content is 11.7%. Charged into an agitating type autoclave of 100 cc. content are 20 g. of $\alpha,\omega$-dichloroalkyl ether thus obtained and 30 g. of ammonia. The mixture is subjected to agitation at 100° C. for 10 hours in a tightly sealed state and then left to cooling. After ammonia is vented, the remaining portion is transferred to a beaker, whereto is added 100 cc. of ethyl ether, followed by filtration. Added to the filtrate is about 3 g. of soda lime granules, followed by agitation for five hours. The solvent is distilled off from the filtrate obtained again from the filtration, whereby 19 g. of $\alpha,\omega$-diaminoalkyl ether is obtained. This compound is excellent in whiteness, exhibits theoretical analytical value of nitrogen, and provides a good raw material for polycondensation.

EXAMPLE 16

Added to 173 g. of tetrahydrofuran in the reactor vessel is 173 g. of oxacyclobutane, and further 35 g. of thionyl chloride. The mixture is cooled in a Dry Ice bath, and added with 0.7 g. of antimony pentachloride at −30° C. Then, the resulting mixture is transferred to a water bath and cooled by water, and subjected to agitation, while the temperature is kept at 20° C. After the polymerization is carried out at 20° C. for 10 hours, the mixture is added with 0.3 g. of N-methylpyrrolidone, followed by agitation, and then added with 10 g. of thionyl chloride, followed by heating and agitation at 80° C. for seven hours. After drying in vacuum, 310 g. of $\alpha,\omega$-dichloroalkyl ether is obtained. The number average molecular weight of this polymer is 2,450, and its chlorine content is 2.9%.

Charged into an agitating type autoclave having a 100 cc. content are 30 g. of of $\alpha,\omega$-dichloroalkyl ether thus obtained and 30 g. of ammonia, and the mixture is subjected to agitation at 100° C. for 10 hours in a tightly sealed state, and then left to cooling. After ammonia is vented, the remaining portion is transferred to a beaker, whereto is added 100 cc. of ethyl ether, followed by filtration. Added to the filtrate is about 3 g. of soda lime granules, followed by agitation for five hours. The solvent is distilled off from the filtrate obtained again by filtration, whereby 28 g. of $\alpha,\omega$-diaminoalkyl ether is obtained. This compound is excellent in whiteness, exhibits theoretical analytical value of nitrogen, and provides a good raw material for polycondensation.

EXAMPLE 17

Added to 100 g. of tetrahydrofuran are 30 g. of thionyl chloride and 0.5 g. of antimony pentachloride. Polymerization is carried out at 20° C. for 70 hours, and the resulting mixture is added with 0.17 g. of pyridine and 20 g. of carbon tetrachloride, followed by heating at a temperature of 80° to 90° C. for three hours. Charged into an autoclave having a 500 cc. content are 40 g. of $\alpha,\omega$-dichloropolytetramethylene oxide having a molecular weight of 1,140 obtained at 92% yield and 40 g. of tetrahydrofuran, and the resulting mixture is added with 80 cc. of liquid ammonia and subjected to agitation and heating to 100° C. in a tightly sealed state. The said condition is kept for seven hours. The reaction mixture is left to cooling after the reaction. After ammonia is vented, the remaining portion is transferred to a beaker, whereto is added 100 cc. of tetrahydrofuran, followed by filtration. Added to the filtrate is about 5 cc. of soda lime granules, followed by agitation for three hours. The solvent is distilled off from the filtrate obtained again by the filtration, whereby 39 g. of $\alpha,\omega$-diaminopolytetramethylene oxide is obtained. This compound is excellent in whiteness, and exhibits theoretical analytical value of nitrogen.

EXAMPLE 18

Added to 100 g. of ethylene oxide are 5 g. of thionyl chloride and 2 g. of antimony pentachloride, and the polymerization is carried out at 10° C. for 10 hours. Then, the resulting mixture is added with 0.9 g. of pyridine and 5 g. of thionyl chloride, and kept at a temperature of 70° to 75° C. for three hours. Charged into an autoclave having a 500 cc. content is 20 g. of α,ω-dichloropolyethylene oxide having a molecular weight of 780 obtained by interrupting the reaction at 46% conversion, together with 300 cc. of 28% aqueous ammonia, and subjected to agitation and heating at 80° C. in a tightly sealed state for 20 hours. After the completion of reaction, water and ammonia are distilled off and the remaining portion is added with 100 cc. of tetrahydrofuran, followed by filtration. Added to the filtrate is 5 cc. of soda lime granules, followed by agitation for three hours. Then, the filtration is carried out again, and the solvent is distilled off from the filtrate, whereby 16 g. of α,ω-diaminopolyethylene oxide is obtained. This compound is excellent in whiteness and exhibits theoretical analytical value of nitrogen.

EXAMPLE 19

Added to a solution mixture of 70 g. of ethylene oxide and 30 g. of propylene oxide are 4 g. of thionyl bromide and 3 g. of antimony pentachloride. Polymerization is carried out at 10° C. for 10 hours. Then, the resulting mixture is added with 0.9 g. of pyridine and 7 g. of thionyl bromide, and kept at a temperature of 70° to 75° C. for three hours. Charged into an autoclave having a 500 cc. content is 50 g. of copolymer polyether (molecular weight: 1,320) obtained by interrupting the reaction at 39% conversion, and further 100 cc. of liquid ammonia. Heating is carried out at 180° C. for five hours in a tightly sealed state. After the reaction, ammonia is vented, and the content is transferred to a beaker, whereto is added 150 cc. of tetrahydrofuran. By carrying out the same procedure successively as in Example 2, 46 g. of polyether diamine having a good whiteness can be obtained. It is confirmed, as a result of elemental analysis, that it contains the theoretical amount of terminal amine.

EXAMPLE 20

Added to a solution mixture of 80 g. of tetrahydrofuran and 20 g. of ethylene oxide are 4 g. of thionyl chloride and 0.2 g. of antimony pentachloride. The polymerization is carried out at 20° C. for three hours, and the resulting mixture is added with 0.1 g. of pyridine and 4 g. of thionyl chloride, and kept at a temperature of 70° to 75° C. for three hours. Charged into an autoclave having a 500 cc. content is 30 g. of copolymer polyether (molecular weight: 1,420) obtained at 90% yield, together with 150 cc. of liquid ammonia, and the mixture is subjected to reaction at 110° C. for five hours in a tightly sealed state. After the reaction and cooling, ammonia is vented, and the resulting reaction content is transferred to a beaker, whereto is added 100 cc. of tetrahydrofuran. By carrying out the same procedure successively as in Example 1, 28 g. of polyether diamine having a good whiteness is obtained. It is recognized, as a result of elemental analysis that it contains amino groups of theoretical amount.

EXAMPLE 21

Added to a solution mixture of 80 g. of tetrahydrofuran and 20 g. of oxacyclobutane are 10 g. of thionyl chloride and 0.3 g. of antimony pentachloride. The polymerization is carried out at 20° C. for 10 hours, and the resulting mixture is then added with 0.15 g. of pyridine, and kept at a temperature of 70° to 75° C. for three hours for reaction. Charged into an autoclave having a 500 cc. content are 50 g. of copolymer polyether (molecular weight: 8,970) obtained at 72% yield and 50 g. of tetrahydrofuran, and further 150 cc. of liquid ammonia. The resulting mixture is agitated in a tightly sealed state and heated at 120° C., and kept at that condition for five hours. After the reaction and being left to cooling, ammonia is vented and the remaining portion is transferred to a beaker, whereto 100 cc. of tetrahydrofuran is added. By carrying out the same procedure successively as in Example 2, 48 g. of polyether diamine having a good whiteness can be obtained. It is confirmed, as a result of elemental analysis, that it contains theoretical amount of terminal amine.

EXAMPLE 22

Added to a solution mixture of 90 g. of tetrahydrofuran and 10 g. of 1,4-epoxycyclohexane are 10 g. of thionyl chloride and 0.3 g. of antimony pentachloride. The polymerization is carried out at 20° C. for 10 hours. Then, the resulting mixture is added with 0.15 g. of pyridine and kept at a temperature of 70° to 75° C. for three hours for reaction. Charged into an autoclave having a 500 cc. content are 50 g. of copolymer polyether (molecular weight: 20,020) obtained at 60% yield and 100 g. of tetrahydrofuran, and further 150 cc. of liquid ammonia. Agitation is carried out in a tightly sealed state with heating at 120° C. Such condition is kept for 20 hours. After the reaction and being left to cooling, ammonia is vented, and the content is transferred into a beaker, whereto 100 cc. of tetrahydrofuran is added. By carrying out the same procedure successively as in Example 2, 47 g. of polyether diamine having a good whiteness can be obtained. It is confirmed, as a result of elemental analysis, that the theoretical amount of terminal amine is contained.

We claim:

1. A method for the synthesis of a block copolymer, which comprises chemically combining two essentially different kinds of molecular chains A and B, where the molecular chain A is a polymer residual radical of a polyoxyalkylene glycol or copolymer thereof, removed of terminal amino groups from bifunctional polymer which is selected from the group having primary amines at both terminals and containing secondary amine in an amount of 3 to 15 equivalent percent of the total amine and has a secondary transition point below −30° C. and has a molecular weight of 500 to 6,000, and the molecular chain A constitutes 50 to 96% weight of the block copolymer, the molecular chain B being selected from the group consisting of polyamides and polyureas containing at least one repeating unit of a polymer having a melting point above 230° C. in a fiber-forming molecular weight range, the repeating unit being

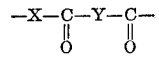

or

where —X— and —Y— are bifunctional organic radicals, the radical —X— containing the terminal nitrogen atom to each of which is attached one of the indicated free valences of the said radical —X—, at least some of said molecular chain B being connected to a terminal carbon atom of the segments of the molecular chain A by a linkage selected from the group consisting of

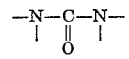

and

through an

—N— of said linkage.

2. A method as claimed in claim 1 wherein the molecular chain A is an α,ω-diaminopolyalkylene oxide prepared by subjecting to ammonolysis α,ω-dihalogenopolyalkylene oxide synthesized by ring-opening polymerization of a cyclic ether using a two-component catalyst consisting of antimony pentachloride and thionyl halide.

3. A method as claimed in claim 1 wherein the molecular chain A is an α,ω-diaminopolyalkylene oxide prepared by subjecting α,ω-dichloropropylalkylene oxide having an average molecular weight of 500 to 6,000 to reaction at an ammoniacal partial pressure of 30 to 110 kg./cm.$^2$ or, if no gaseous phase exists, in such a state to be in equilibrium with ammoniacal partial pressure of the said range by keeping a reaction temperature at 65° to 160° C.

4. A method as claimed in claim 2 wherein the ammonolysis product is further treated with a solid or liquid alkali capable of absorbing chlorine ion to obtain purified α,ω-diaminopolyalkylene oxide.

5. A method as claimed in claim 2 wherein the α,ω-diaminopolyalkylene oxide is α,ω-diaminotetramethylene oxide.

6. A method as claimed in claim 2 wherein the α,ω-diaminopolyalkylene oxide is obtained by copolymerization of ethylene oxide and tetrahydrofuran.

7. A method as claimed in claim 1, where the molecular chain A is contained in an amount of at least 60 to 85 percent by weight of the copolymer.

8. A method as claimed in claim 1, where a solvent is used at the melting polymerization.

9. A method as claimed in claim 8, where the solvent is metacresol.

10. A method as claimed in claim 8, where the solvent is phenol.

11. A method as claimed in claim 1, where the molecular chain B consists of repeated unit structures of polyparaxylylene sebacamide.

12. A method as claimed in claim 1, where the molecular chain consists of repeated unit structures of polypiperazine terephthalate.

References Cited
FOREIGN PATENTS 963,320    7/1964    Great Britain.

MURRAY TILLMAN, *Primary Examiner.*

P. LIEBERMAN, *Assistant Examiner.*